United States Patent
Cordonnier et al.

(10) Patent No.: US 11,471,892 B2
(45) Date of Patent: Oct. 18, 2022

(54) METHOD FOR SEPARATING DIFFERENT CONSTITUENTS OF A CONCRETE FOR DECONSTRUCTION

(71) Applicant: FIVES FCB, Villeneuve d'Ascq (FR)

(72) Inventors: Alain Cordonnier, Villeneuve d'Ascq (FR); François Boudot, Villeneuve d'Ascq (FR); Alain Fruchart, Villeneuve d'Ascq (FR); Yannick Guimard, Villeneuve d'Ascq (FR); Jérôme Portal, Villeneuve d'Ascq (FR)

(73) Assignee: FIVES FCB, Villeneuve d'Ascq (FR)

( * ) Notice: Subject to any disclaimer, the term of this patent is extended or adjusted under 35 U.S.C. 154(b) by 0 days.

(21) Appl. No.: 17/639,143

(22) PCT Filed: Sep. 1, 2020

(86) PCT No.: PCT/EP2020/074369
§ 371 (c)(1),
(2) Date: Feb. 28, 2022

(87) PCT Pub. No.: WO2021/043775
PCT Pub. Date: Mar. 11, 2021

(65) Prior Publication Data
US 2022/0266254 A1 Aug. 25, 2022

(30) Foreign Application Priority Data
Sep. 2, 2019 (FR) ..................................... 1909630

(51) Int. Cl.
*B02C 17/18* (2006.01)
*C04B 18/16* (2006.01)

(52) U.S. Cl.
CPC ........ *B02C 17/1885* (2013.01); *C04B 18/167* (2013.01)

(58) Field of Classification Search
CPC ..... B02C 15/00; B02C 17/18; B02C 17/1885; B02C 23/08; B07B 1/00; B07B 4/00; B07B 7/01; B07B 11/02; C04B 7/24; C04B 18/16; C04B 18/167; C04B 20/02
See application file for complete search history.

(56) References Cited

U.S. PATENT DOCUMENTS

| | | | | |
|---|---|---|---|---|
| 5,884,856 A | * | 3/1999 | Isaji | ........................ B03B 9/065 241/76 |
| 6,582,610 B2 | * | 6/2003 | Williams | .................. C02F 1/66 210/768 |
| 10,029,951 B2 | * | 7/2018 | Juilland | ................ C04B 20/023 |

FOREIGN PATENT DOCUMENTS

| | | |
|---|---|---|
| CN | 1834051 A | 9/2006 |
| FR | 1578032 A | 8/1969 |
| FR | 2959679 A1 | 11/2011 |
| JP | S5869772 A | 4/1983 |
| JP | H04021550 A | 1/1992 |
| JP | H11335149 A | 12/1999 |
| JP | 2000103658 A | 4/2000 |
| WO | 2013087421 A1 | 6/2013 |

OTHER PUBLICATIONS

International Search Report dated Nov. 18, 2020, in corresponding application No. PCT/EP2020/074369; 5 pgs.
Written Opinion dated Nov. 18, 2020, in corresponding application No. PCT/EP2020/074369; 9 pgs.
Office Action dated Aug. 1, 2022 in corresponding Japanese Application No. 2022-513953 (7 pages, including machine-generated English translation).
Office Action dated Jun. 23, 2022 in corresponding Chinese Application No. 202080059621.0 (10 pages, including English translation).

* cited by examiner

*Primary Examiner* — Anthony J Green
(74) *Attorney, Agent, or Firm* — Maier & Maier, PLLC

(57) ABSTRACT

A method of separating different constituents of a fine fraction that is produced in a prior method for separating a concrete for deconstruction. The method allows the reuse of these different constituents in the production of a new cement and/or of a new concrete, the fine fraction including sand and at least 30% by mass of hydrated cement paste.

8 Claims, 2 Drawing Sheets

METHOD FOR SEPARATING DIFFERENT CONSTITUENTS OF A CONCRETE FOR DECONSTRUCTION

FIELD

The invention relates to a method for separating different constituents of a fine fraction resulting from a previous method for separating concrete for deconstruction. In particular, the invention relates to the recycling of concrete for deconstruction.

BACKGROUND

Cement concrete is widely used in construction and infrastructure works, that is to say for example buildings, roads and engineering structures.

Conventionally, cement concrete, after drying, is mainly composed of:
  about 50% gravel,
  about 30% sand (in the granulometric sense of the term)
  about 20% cement paste, hydrated during the setting reaction of this concrete.

Cement is a hydraulic binder produced from Portland clinker.

The production of cement concrete involves the exploitation of natural resources, in particular mineral resources to extract the aggregate, comprising gravel and sand. The impact on the environment is therefore not negligible, in particular due to the exploitation of non-renewable natural resources, but also due to the pollution and nuisance caused by the transport of these resources from their place of extraction to the construction site where they are used to produce concrete. This exploitation has an impact on the environment and develops a negative feeling in public opinion.

Sustainable development having become a strategic issue, various countries have already favoured, even imposed, the use of a share of recycled concrete for deconstruction in new structures, in order to develop short circuits.

To best recycle the different constituents of the concrete for deconstruction, it is important to properly separate the different constituents of this concrete. It is therefore necessary to treat the concrete for deconstruction to obtain gravel, sand and hydrated cement paste.

A first separation operation consists in grinding the concrete for deconstruction to obtain gravel on the one hand and a fine fraction on the other hand. The gravel has a minimum diameter of about 2 to 6 millimetres and a maximum diameter of about 30 millimetres. The gravel thus recycled is stored and ready to be used for the production of new concrete. The fine fraction comprises mortar particles, which is a heterogeneous mixture of sand and hydrated cement paste, the diameter of which is less than 6 millimetres.

The fine fraction can be used directly as a constituent to produce new concrete by substituting it for sand.

The use of this fine fraction as a substitute sand has several disadvantages.

A disadvantage is that it is not possible to use large proportions of this fine fraction as a substitute for sand because it contains a large part of hydrated cement paste which has mechanical and physico-chemical properties different from those of sand, in particular in terms of mechanical strength and porosity.

Indeed, the high porosity of the hydrated cement paste contained in the fine fraction makes it more difficult and risky to measure the amount of water to be incorporated into the mixture of the new concrete, to the detriment of the quality of said new concrete. In order to mitigate the deleterious effects of this hazardous measurement, it is necessary to add larger amounts of cements and admixtures, which increases production costs and has an obvious impact on the environment.

Another disadvantage is that it is difficult to know precisely the proportions of sand and hydrated cement paste in this fine fraction, thus concrete manufacturers naturally tend to minimise the proportion of fine fraction as a substitute for sand to avoid degrading the performance of the concrete.

Alternatively, the fine fraction can be incorporated as a component of a cement raw material for the manufacture of a new cement clinker, replacing the natural materials conventionally used such as limestone and clay. However, the fine fraction as a component of a cement raw material comes up against a difficulty in knowing the proportion of this fine fraction in the cement raw material. Indeed, this proportion is largely minimised due to the presence of silica in the fine fraction, which is undesirable in a large proportion in a cement raw material. The use of more fine fraction in cement raw materials would offer many advantages.

In what follows, the fine fraction resulting from the first separation operation is called feed material.

The invention aims at proposing a solution to at least one of the aforementioned disadvantages. In particular, the invention aims at recycling almost all of the fine fraction in order to incorporate greater proportions thereof into cement raw materials and/or into concretes.

SUMMARY

To this end, a method is first proposed for separating different constituents of a fine fraction resulting from a previous method for separating a concrete for deconstruction allowing the reuse of these different constituents in the production of a new cement and/or a new concrete, the fine fraction comprising sand and at least 30% by mass of hydrated cement paste, the fine fraction being hereinafter referred to as the feed material, the method implementing a facility including:
  an attrition system, and
  a separation system, and wherein the method comprises:
  the feed of the system with the feed material to grind it,
  the attrition of feed material, and
  the separation of the ground feed material in the attrition system (3), into a sandy fraction comprising an amount of hydrated cement paste less than or equal to 25% and greater than or equal to 5% by mass, and a fraction of hydrated cement paste comprising an amount of hydrated cement paste greater than or equal to 40% and less than or equal to 95% by mass.

Separating the feed material into a sand fraction and a hydrated cement paste fraction in the above proportions includes several advantages.

With a view to reusing the sandy fraction as sand for cement concrete, the aim is to obtain a sandy fraction:
  having a granulometry which is acceptable for this reuse, that is to say whose grain size is greater than a predetermined size, and
  containing as little hydrated cement paste as possible because the latter, due to its porosity, would be detrimental to mastering the recipe for the new concrete.

Regarding the hydrated cement paste fraction, with a view to its use as a component of a cement raw material for the manufacture of a new cement clinker, it is preferable that it is as pure as possible for its chemical composition to be closest to that of a cement clinker.

A total purity, that is to say a hydrated cement paste fraction devoid of sand, is industrially unrealistic due to the complexity and associated costs.

The applicant has determined that a sandy fraction containing hydrated cement paste and a hydrated cement paste fraction containing sand in the proportions mentioned above according to the invention advantageously allows to incorporate a greater proportion of sandy fraction in new concrete and a higher proportion of hydrated cement paste fraction in cement raw material. This has the consequence of increasing the recycling rates of concrete for deconstruction, reducing the environmental impact of cement production (reduction of $CO_2$ emissions by adding decarbonated lime, reducing the use of limestone in the cement raw material and therefore minimising decarbonation and fuel consumption) and concrete production (reduction of the consumption of natural sand resources).

It is also emphasised that the applicant has determined that when these proportions are respected, the sandy fraction and the hydrated cement paste fraction can be respectively used, as sand in the production of concrete, and component of a cement raw material in the production of clinker safely and in large amounts.

Various additional features may be provided alone or in combination:
- the feed material feeding the attrition system has dimensions of less than 6 millimetres;
- the separation is carried out by means of a cut-off mesh of the separation system comprised between 50 and 300 micrometres;
- the separation is carried out by means of a cut-off mesh of the separation system comprised between 80 and 200 micrometres;
- the attrition is carried out by means of the attrition system including grinding bodies of the ball or cylpebs type;
- the attrition is carried out by means of the attrition system which comprises a substantially cylindrical chamber of length L and of diameter d, and wherein the ratio L/d is comprised between 1 and 5;
- the attrition is carried out by means of the attrition system whose balls or cylpebs have a diameter comprised between 5 and 20 millimetres;
- the rotational speed of the attrition system is comprised between 60 and 85% of a critical speed corresponding to the speed at which the balls are centrifuged;
- the speed of the gas injected into the attrition system is comprised between 0.5 and 3 m/s.

BRIEF DESCRIPTION OF THE FIGURES

Other features and advantages of the invention will appear when reading the following detailed description for the understanding of which reference will be made to the appended drawings wherein.

DETAILED DESCRIPTION

Figure 1:
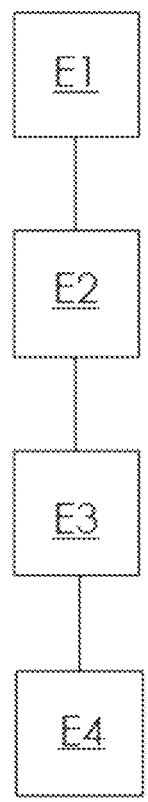
FIG. 1 is a schematic representation of a method according to the invention.
Figure 2:
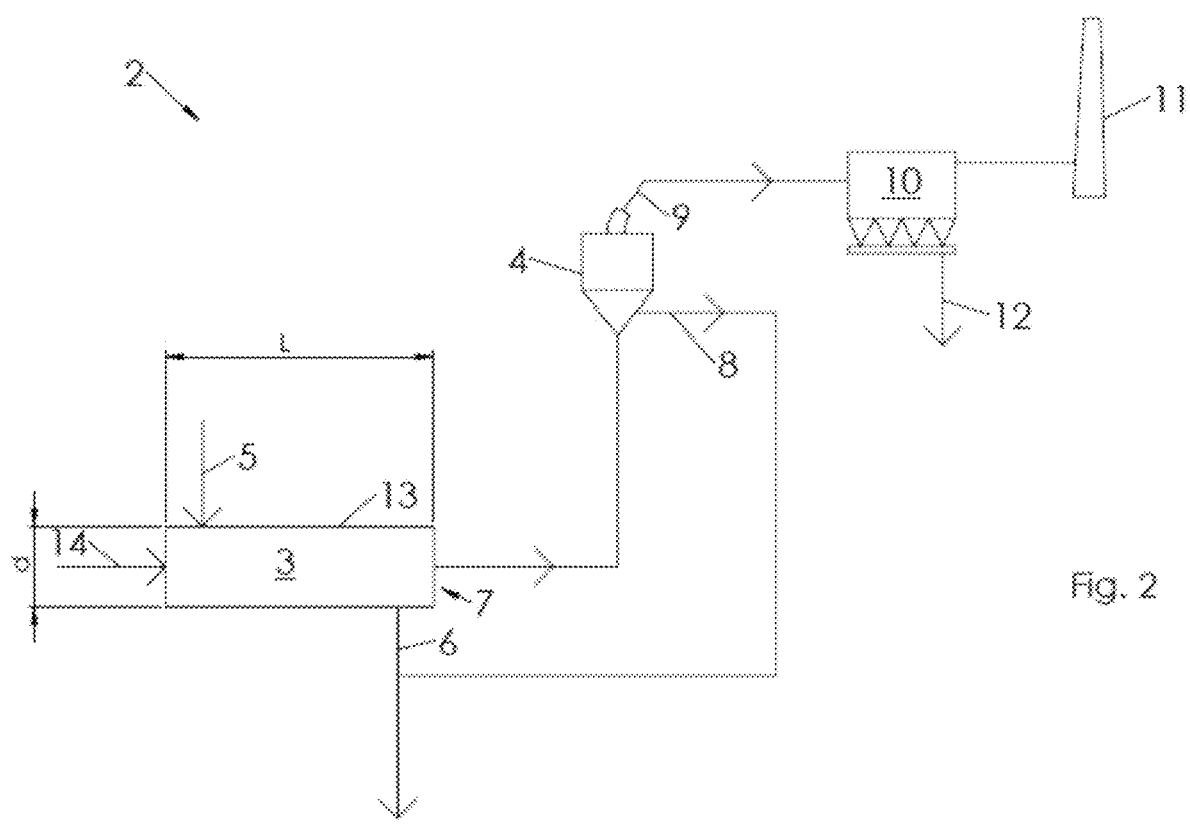
FIG. 2 is a schematic representation of a facility according to the invention.

FIG. 1 shows a method 1 for separating different constituents of a fine fraction resulting from a previous method for separating concrete for deconstruction. The method 1 uses a facility 2 illustrated in FIG. 2. In what follows, the fine fraction becomes the feed material.

The facility 2 includes an attrition system 3 and a separation system 4. The attrition system 3 is a ball or cylpebs grinder. Balls are substantially spherical grinding bodies. The cylpebs are substantially cylindrical grinding bodies sometimes frustoconical shaped or barrel shaped.

The grinder 3 is fed with the feed material through an inlet 5 during a feeding step E1. In the grinder 3, the feed material is ground during an attrition step E2. The feed material includes at least 30% by mass of hydrated cement paste. In general, the feed material includes 35 to 50% by mass of hydrated cement paste. The hydrated cement paste is the result of the chemical reaction between cement and water mixed in an initial concrete. The feed material has dimensions less than 6 millimetres.

In the grinder 3, the attrition phenomenon frees the grains of sand from a matrix of hydrated cement paste, and grinds this hydrated cement paste into a fine powder.

During a step E3, a gas flow, generally air, is sent inside the grinder 3 through a gas inlet 14. This gas flow allows to drive the finest portion of the material towards the separation system 4. The other portion, namely the larger grains, is discharged through a discharge outlet 6 located at an end 7 of the grinder 3. In a variant, not shown in the drawings, all or a portion of the material exiting through the discharge outlet 6 can be transported by a handling means to the separation system 4 in order to remove the hydrated cement paste therefrom. More generally, the material can be transported by any handling means.

During a separation step E4, all or a portion of the ground feed material is separated in the separation system 4 so as to discharge the sandy fraction through a sand outlet 8 and to discharge the hydrated cement paste fraction with the gas flow through an exhaust 9.

The facility 2 comprises a filter 10 and a chimney 11. The gas flow carrying the hydrated cement paste fraction is filtered in the filter 10 then discharged through a chimney 11. The hydrated cement paste fraction is recovered through an outlet 12.

Advantageously, the sandy fraction contains an amount of hydrated cement paste less than or equal to 25% and greater than or equal to 5% by mass and the hydrated cement paste fraction contains an amount of hydrated cement paste greater than or equal to 40% and less than or equal to 95% by mass.

The recycling of the sandy fraction having such proportions of hydrated cement paste allows to reduce the use of natural resources for the production of concrete. Indeed, this sandy fraction can be used in large amounts as a substitute for natural sand.

Recycling the hydrated cement paste fraction having such proportions of sand allows to reduce the use of natural resources and in particular provides decarbonated lime, which reduces the use of limestone in the cement raw material and therefore the amount of $CO_2$ emitted by the decarbonation of this limestone and the corresponding fuel consumption. Indeed, this hydrated cement paste fraction can be used in large amounts in the cement raw material.

The grinder 3 includes a substantially cylindrical chamber 13 with a substantially horizontal axis of rotation wherein the balls or cylpebs (not shown) are housed. The attrition is achieved by rotating the cylindrical chamber 13. The chamber 13 has a length L and a diameter d such that the ratio L/d is comprised between 1 and 5. Such a chamber 13 allows to obtain the necessary and sufficient residence time for the attrition of the material, without violently grinding the grains of sand.

The balls or cylpebs have a diameter comprised between 5 and 20 millimetres. The balls or cylpebs are made of steel. The size of the balls or cylpebs is adapted to provide the energy just necessary, that is to say neither too much nor too little energy, to the balls or cylpebs to grind the material without damaging the structure of the grains of sand, by limiting the intensity of the shocks between these balls or cylpebs and the feed material.

The speed of rotation of the chamber 13 is advantageously comprised between 60 and 85% of the critical speed. The critical speed is the minimum speed of centrifugation of the balls or cylpebs. This speed of rotation allows to provide the energy just necessary for the balls or cylpebs to grind the material without damaging the structure of the grains of sand.

The gas flow travels through the grinder 3 at a speed comprised between 0.5 and 3 metres per second. Such a gas speed allows to discharge from the grinder 3 the finest fraction of the material in order to prevent the grinder 3 from choking with the material and therefore to maintain the efficiency of the grinder.

The separation system 4 is a granulometric separator. Advantageously, the cut-off mesh of the granulometric separator 4 is comprised between 50 and 300 micrometres. This cut-off mesh allows to obtain a sandy fraction and a hydrated cement paste fraction containing respectively the proportions of hydrated cement paste and sand mentioned above.

Other cut-off meshes can be used.

For example, a cut-off mesh comprised between 50 and 120 micrometres allows to favour the quality of the hydrated cement paste fraction to the detriment of its amount and to the detriment of the quality of the sandy fraction.

A cut-off mesh comprised between 120 and 300 micrometres allows to favour the quality of the sandy fraction to the detriment of its amount and to the detriment of the quality of the hydrated cement paste fraction.

According to a preferred embodiment, this cut-off mesh is comprised between 80 and 200 micrometres in order to obtain the best compromise between the quality and the recycled amount of each fraction.

The invention claimed is:

1. A method for separating different constituents of a fine fraction resulting from a previous method for separating a concrete for deconstruction allowing the reuse of these different constituents in the production of a new cement and/or of a new concrete, the fine fraction comprising sand and at least 30% by mass of hydrated cement paste, the fine fraction being hereinafter referred to as the feed material, the method implementing a facility including:
   an attrition system, and
   a separation system, and wherein the method comprises the steps of:
   feeding the attrition system with the feed material to grind the feed material,
   attriting the feed material to form ground feed material, and
   seperating the ground feed material in the attrition system is carried out by means of a cut-off mesh of the separation system comprised between 50 and 300 micrometres so as to obtain a sandy fraction comprising an amount of hydrated cement paste less than or equal to 25% and greater than or equal to 5% by mass, and a fraction of hydrated cement paste comprising an amount of hydrated cement paste greater than or equal to 40% and less than or equal to 95% by mass.

2. The method according to claim 1, wherein the feed material has dimensions of less than 6 millimetres.

3. The method according to claim 1, wherein the separating step is carried out by means of a cut-off mesh of the separation system comprised between 80 and 200 micrometres.

4. The method according to claim 1, wherein the attriting step is carried out by means of the attrition system including grinding bodies selected from balls or cylpebs.

5. The method according to claim 4, wherein the attriting step is carried out by means of the attrition system which comprises a substantially cylindrical chamber of length L and of diameter d, and wherein the ratio L/d is comprised between 1 and 5.

6. The method according to claim 4, wherein the attriting step is carried out by means of the attrition system including balls or cylpebs that have a diameter comprised between 5 and 20 millimetres.

7. The method according to claim 4, wherein the attrition system has a rotational speed that is comprised between 60 and 85% of a critical speed corresponding to the speed at which the balls are centrifuged.

8. The method according to claim 1, wherein a gas is injected into the attrition system at a speed that is comprised between 0.5 and 3 m/s.

* * * * *